United States Patent
Ho et al.

(10) Patent No.: US 6,477,375 B1
(45) Date of Patent: Nov. 5, 2002

(54) METHOD AND SYSTEM FOR REDUCING CALL SETUP PROCESSING COST BY DETERMINING WHEN TO FORWARD CALLS TO DETACHED SUBSCRIBERS

(75) Inventors: Joseph S. M. Ho, Dallas, TX (US); Hector Maturino, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/293,390

(22) Filed: Apr. 16, 1999

(51) Int. Cl.$^7$ ................................................. H04Q 7/20
(52) U.S. Cl. ........................................ 455/445; 455/433
(58) Field of Search ................................. 455/445, 432, 455/433, 440, 456, 414, 417

(56) References Cited

U.S. PATENT DOCUMENTS

| | | | |
|---|---|---|---|
| 5,400,390 A | * 3/1995 | Salin | 455/433 |
| 5,506,887 A | * 4/1996 | Emery et al. | 455/445 |
| 5,920,812 A | * 7/1999 | Palviainen | 455/417 |
| 5,978,673 A | * 11/1999 | Alperovich et al. | 455/417 |
| 6,167,264 A | * 12/2000 | Palviainen et al. | 455/433 |
| 6,285,879 B1 | * 9/2001 | Lechner et al. | 455/432 |

* cited by examiner

*Primary Examiner*—Nay Maung
*Assistant Examiner*—Quochien B. Vuong
(74) *Attorney, Agent, or Firm*—John D. Crane; Bracewell & Patterson, L.L.P.

(57) ABSTRACT

A method and system for improving overall system capacity in GSM networks by reducing the number of visitor location register queries is disclosed. The method and system determines if subsequent calls for a mobile terminal which has been detached by its subscriber from the GSM network should require querying of its visiting mobile switching center and HLR based on the call arrival characteristics of the subscriber. A "call-arrival-after detach" counter is created at the home location register and visitor location register for tracking the number of incoming calls that occur during the interval when the subscriber has detached. The value of this counter is compared for every incoming call to a threshold level value for determining if the call is to be forwarded. The threshold level value is determined on the past call arrival characteristics of the subscriber. The method and system of the present invention makes it unnecessary to query the VLR when a land-to-mobile call arrives for a subscriber and the subscriber has detached from the network thereby increasing network capacity while reducing processing load.

18 Claims, 12 Drawing Sheets

(AMEND)

METHOD AND SYSTEM FOR REDUCING CALL SETUP PROCESSING COST BY DETERMINING WHEN TO FORWARD CALLS TO DETACHED SUBSCRIBERS

BACKGROUND OF THE INVENTION

1. Technical Field

The present invention is directed to an improved method and system for increasing network capacity in a Global System for Mobile Communications (hereinafter GSM) networks and in particular for overall system capacity improvement by reducing the number of visitor location register queries. Still more particularly the present invention relates to an improved method and system for determining when to forward calls to a visiting mobile switching center when a subscriber has detached from the GSM network.

2. Description of the Related Art

In telecommunications, based on a Global System for Mobile Communications "GSM" standard, a land-to-mobile phone call consists of two-phases; a setup phase and a user communication phase. During the call setup phase, signaling messages are exchanged between a mobile terminal and a network through a dedicated signaling channel. Currently, the land-to-mobile GSM call setup procedure requires the interrogation every time by a gateway mobile switching center GMSC to a remote home location register (referred to as HLR) and then to a visitor location register (referred to as VLR) located at a visiting mobile switching center for the network to set up a call to the mobile terminal. Having to continuously interrogate the HLR and visiting mobile switching center (hereinafter the VMSC) when a subscriber has detached from the GSM network results in significant processing overhead at the HLR and VMSC. This increases the signaling traffic load, as well as call setup delay.

Therefore, a need exists to increase network efficiency and improve the grade of service by reducing the HLR/VMSC signal-processing load. Capacity improvement can be obtained by reducing the number of HLR/VLR queries. In view of the above, it should be apparent that a method and system that allows the processing of calls without HLR and VLR queries when a subscriber has detached would be highly desirable. The present invention solves this problem in a new and unique manner that has not been part of the art previously.

SUMMARY OF THE INVENTION

It is therefore one object of the present invention to provide an improved method for call setups for GSM networks and in particular for overall system capacity improvement in GSM networks by reducing the number of home location register and visitor location register queries.

It is another object of the present invention to provide a method which reduces the processing requirement at the home location register and the visiting mobile switching centers due to the removal of some of the send routing information and provide roaming number messages.

It is yet another object of the present invention to provide an improved method that determines the routing of calls from gateway mobile switching center to a forwarding number when the subscriber has detached from the network.

The foregoing objects are achieved as is now described. A method and system for improving overall system capacity in GSM networks by reducing the number of visitor location register queries is disclosed. The method and system determines if processing subsequent calls for a mobile terminal which has been detached by its subscriber from the GSM network should involve its visiting mobile switching center based on the call arrival characteristics of the subscriber. A "call-arrival-after detach" counter is created at the home location register and visitor location register for tracking the number of incoming calls that occur during the interval when the subscriber has detached. The value of this counter is compared for every incoming call to a threshold level value for determining how the call is to be processed. The threshold level value is determined based on the past call arrival characteristics of the subscriber. The method and system of the present invention makes it unnecessary to query the VLR and HLR when a land-to-mobile call arrives for a subscriber and the subscriber has detached from the network thereby increasing network capacity while reducing processing load.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
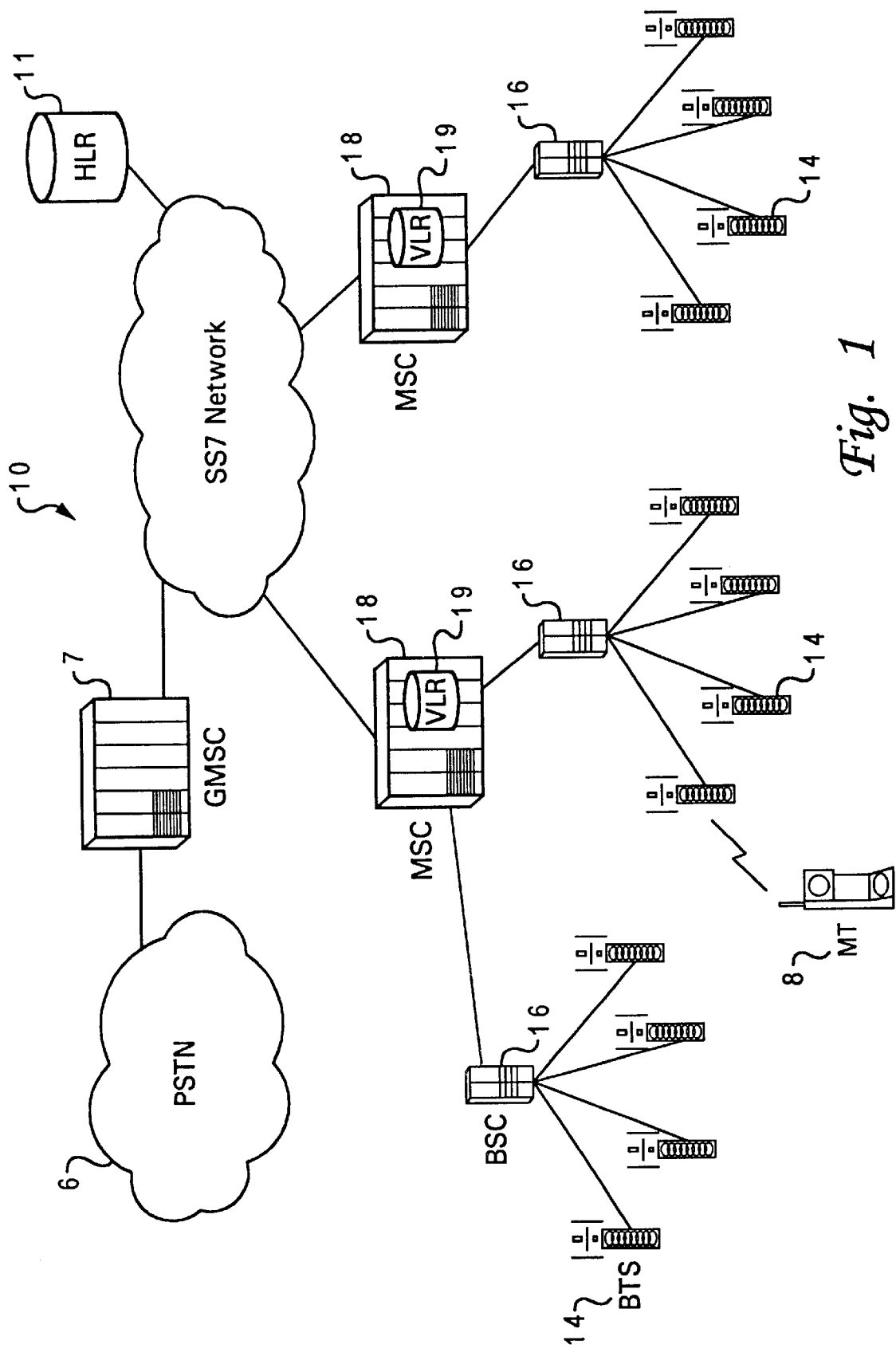
FIG. 1 is an illustrative block diagram of a GSM network in accordance with the present invention.

With reference now to the figures and in particular with reference to FIG. 1, there is depicted a block diagram of an illustrative embodiment of a Global System for Mobile Communications (hereinafter GSM) network 10 in accordance with the present invention. The GSM 10 air interface consists of a number of channels, which include Full Traffic Channels, Standalone Dedicated Control Channels, Random Access Channels, and a number of other channels, such as the Access Grant Channel and the Synchronization Channel.

Turning once again to FIG. 1, the GSM network 10 consists of a number of Mobile Switching Centers (MSCs) 18. The MSC 18 is responsible for the switching of trunk circuits as well as the processing of call setup and mobility management signaling messages. A MSC 18 which has a direct trunk connection to the PSTN 6 is called the Gateway MSC (GMSC) 7. The GMSC 7 is the entry point to the GSM network 10 for all calls that originate from the PSTN 6. There may exist one or more GMSCs 7 in a GSM network 10. Each MSC 18 supports a number of Base Station Controllers (BSCs) 16 which, in turn, is connected to a number of Base Transceiver Stations (BTSs) 14. Most of the air interface related control functions, such as channel allocation, are implemented at the BSCs 16. The BTSs 14 are responsible for interfacing with the mobile terminal using the allocated GSM air channel. The MSC service area is divided into one or more non-overlapping Location Areas (LAs). Each LA consists of a number of BTSs 14. The coverage area of a BTS 14 is referred to as a cell.

Two types of database exist in the GSM network 10: the Home Location Register (HLR) 11 and the Visitor Location Register (VLR) 19. The HLR 11 stores the permanent records of its supported subscribers. These records contain information such as the serving VLRs 19, and the subscription parameters of the mobile terminals and many of the existing GSM networks 10 contain only one HLR 11. In practice, several HLRs 11 can be installed in a GSM network when the subscriber population is large. The VLR 19 contains a copy of the records of the subscribers currently residing in its service area. In addition, the VLR 19 also keeps track of the current LA of each mobile terminal. This information is only temporarily stored at the VLR 19 and is removed from the VLR 19 once the subscriber moves to a neighboring VLR 19. Most network equipment manufacturers have adopted a combined MSC 18 and VLR 19 approach such that each VLR 19 co-locates with a MSC 18.

Figure 2:
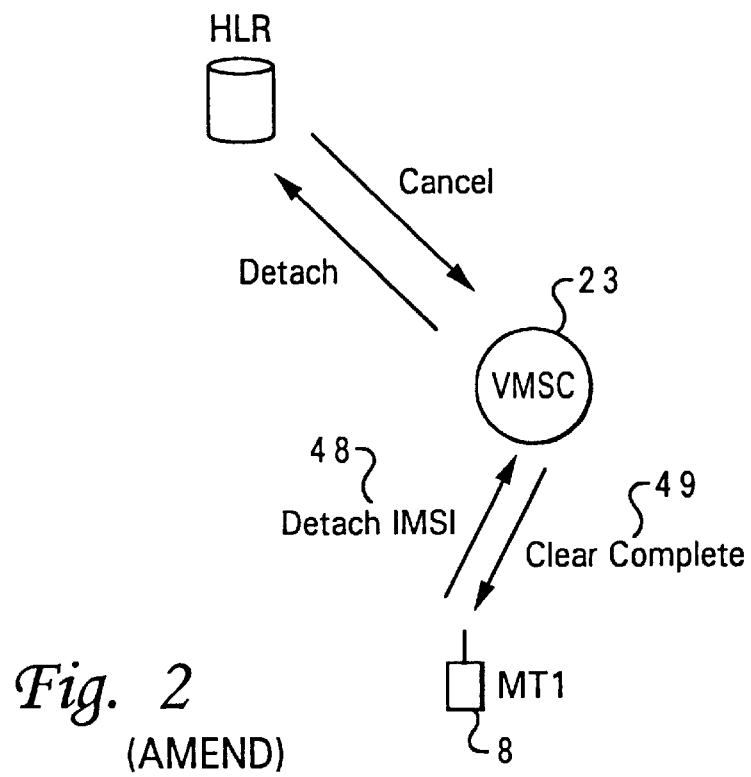
FIG. 2 is a detailed block diagram for detaching a mobile terminal at a VMSC.
Figure 3:
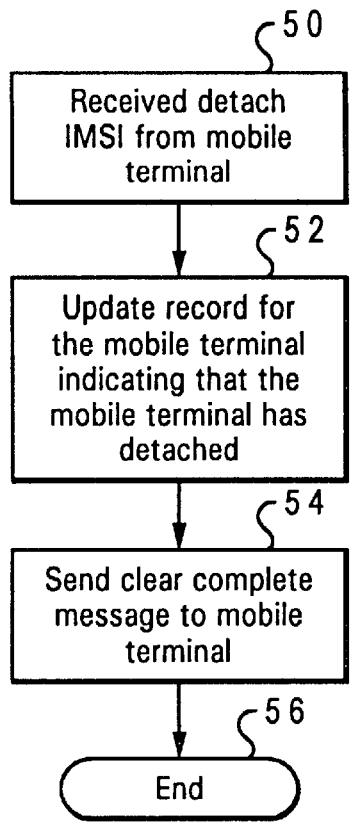
FIG. 3 is a flowchart of FIG. 2 for detaching the mobile terminal at the VMSC.

In a GSM network 10, the HLR 11 always stores the identity of the current serving, or visiting, MSC (VMSC) 23 of each of its support mobile terminals. This information is required for call setup when a call for a mobile terminal 8 arrives. To ensure that the HLR 11 contains the accurate and up-to-date VMSC ID of each of its support mobile terminals, a mobile terminal 8 must report its new location to the network when it moves to a new VMSC 23. This reporting procedure is commonly referred to as location update. Referring now to FIGS. 2 and 3, there is depicted a block diagram and a flowchart for detaching a mobile terminal 8 at a VMSC 23 in accordance with the GSM standard. As shown in step 50, a mobile terminal 8 when turned off by a subscriber sends a detach IMSI message 48 which is received by the VMSC 23. The VMSC 23.then updates its records for the mobile terminal indicating that the mobile terminal has detached, as shown in step 52. The process then completes in steps 54 and 56 by the VMSC 23 sending back a clear complete 49 message to the mobile terminal 8 in accordance with the GSM standard. The VMSC 23 also notifies the HLR 11 that the mobile terminal 8 has detached by sending a DETACH message to the HLR 11. The HLR 11, in turn, sets a flag associated with the mobile terminal 8 to indicate that the mobile terminal 8 has detached from the network. Following which, in an advantageous embodiment, the HLR 11 sends a CANCEL message to the VSMC 23 to cancel the mobile terminal 8 registration at the VSMC 23. The mobile terminal 8 is now detached from the GSM network.

Figure 4:
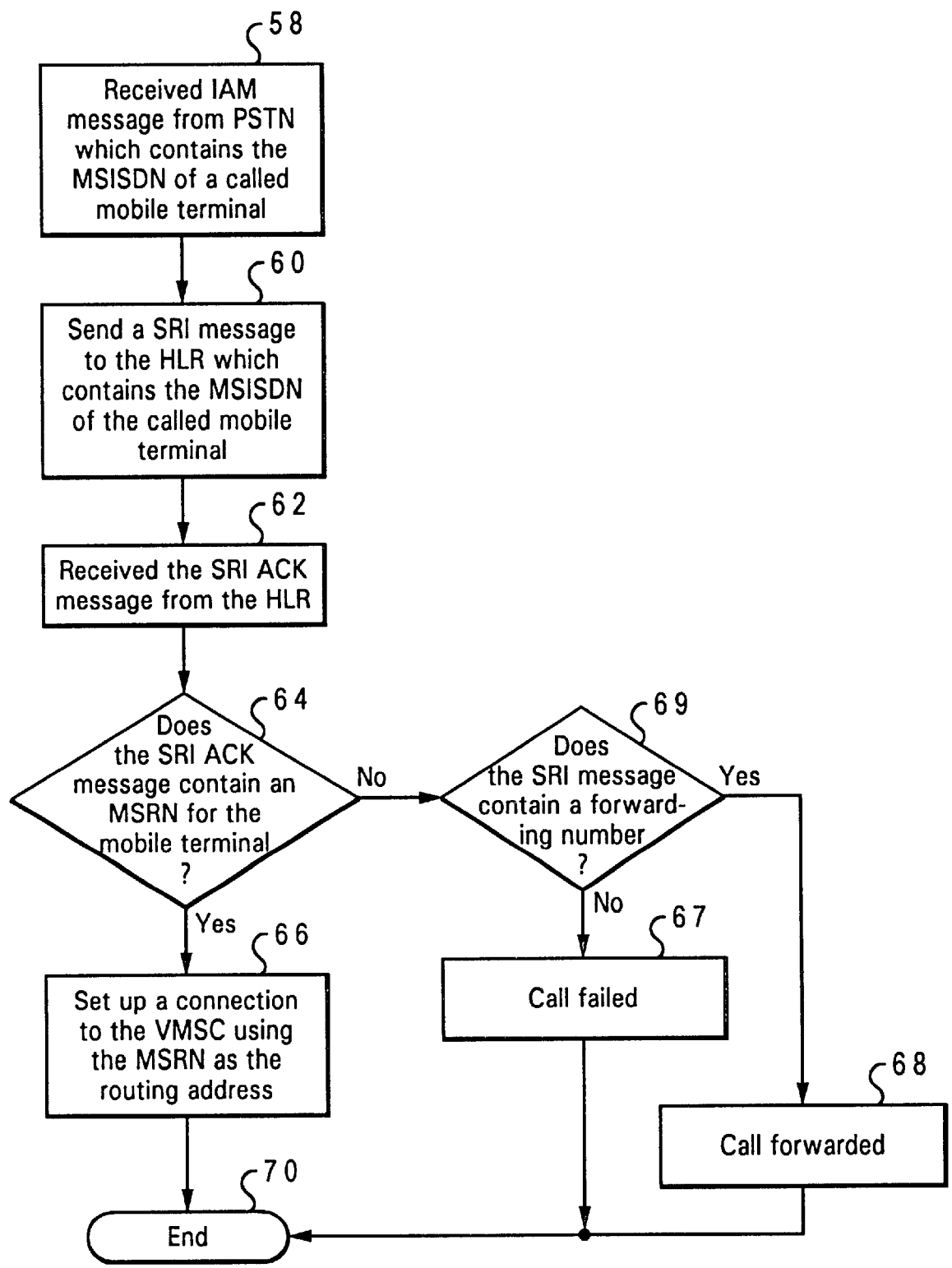
FIG. 4 is a flowchart for illustrating the operations at the GMSC for a land-to-mobile call setup under the GSM standard.
Figure 5:
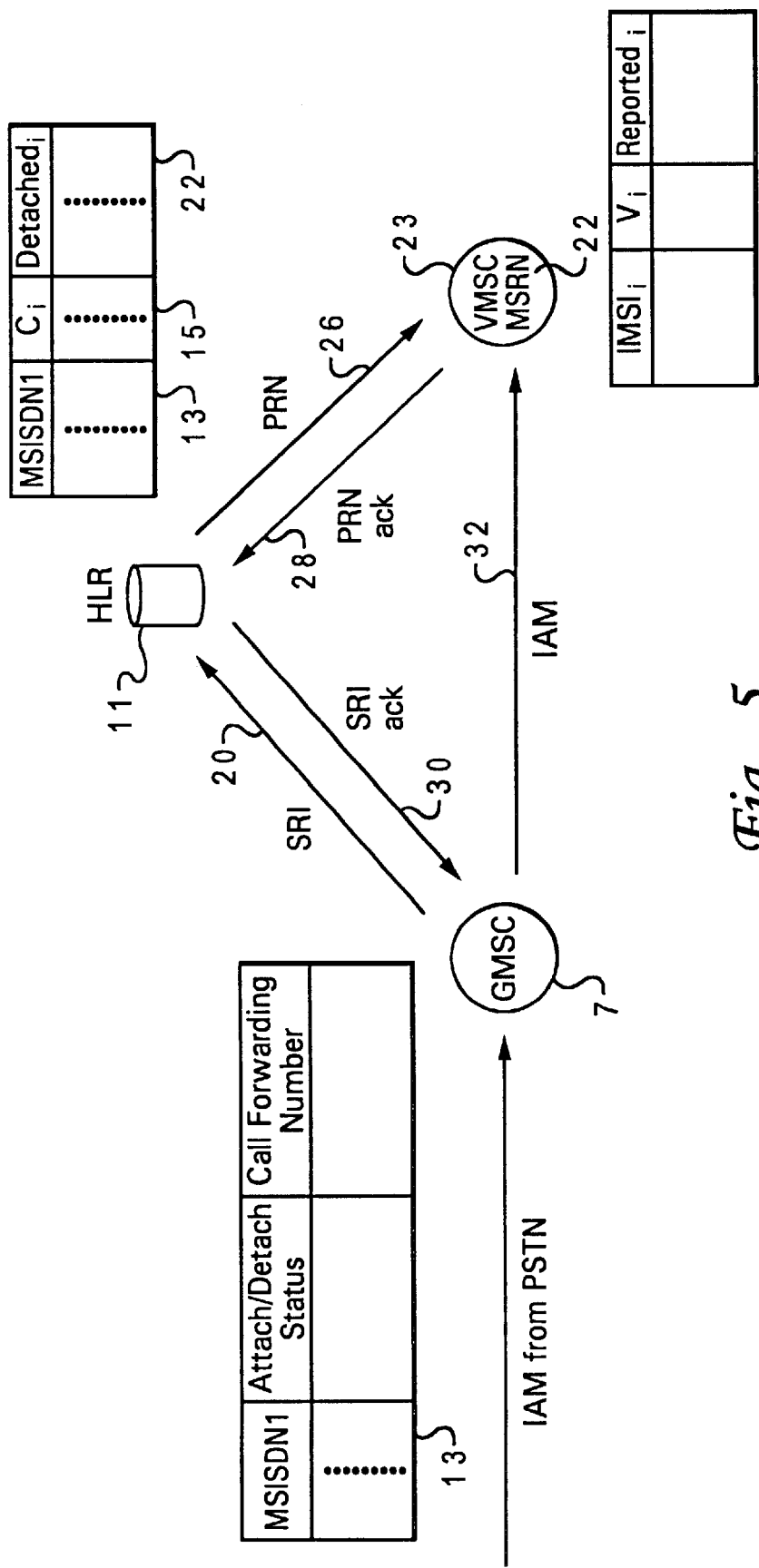
FIG. 5 is a block diagram illustrating the signaling exchange for a land-to-mobile call setup in accordance with the method of the present invention.
Figure 6:
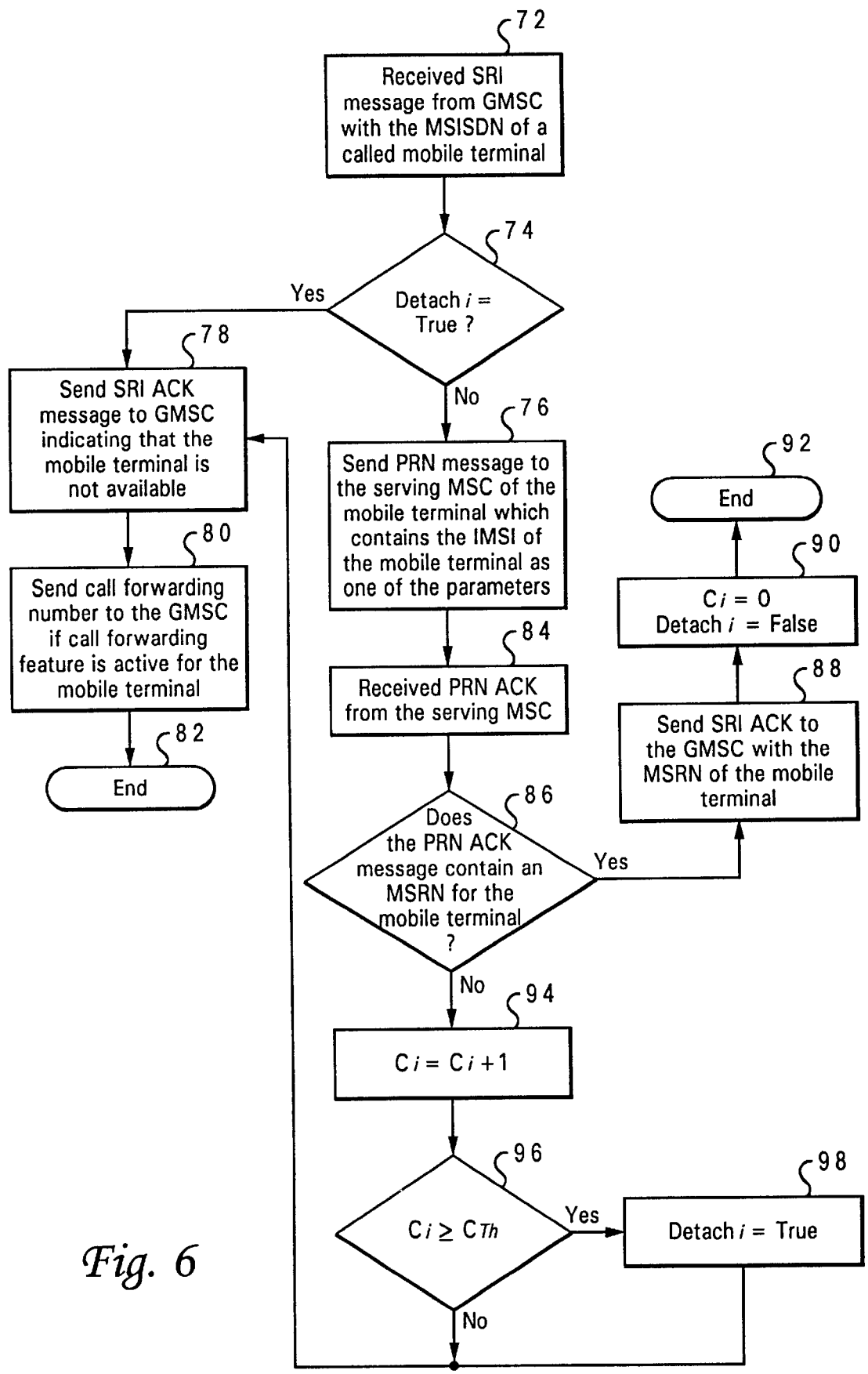
FIG. 6 is a flowchart for illustrating the signaling exchange at the HLR for a land-to-mobile call setup in accordance with the method of the present invention.
Figure 7:
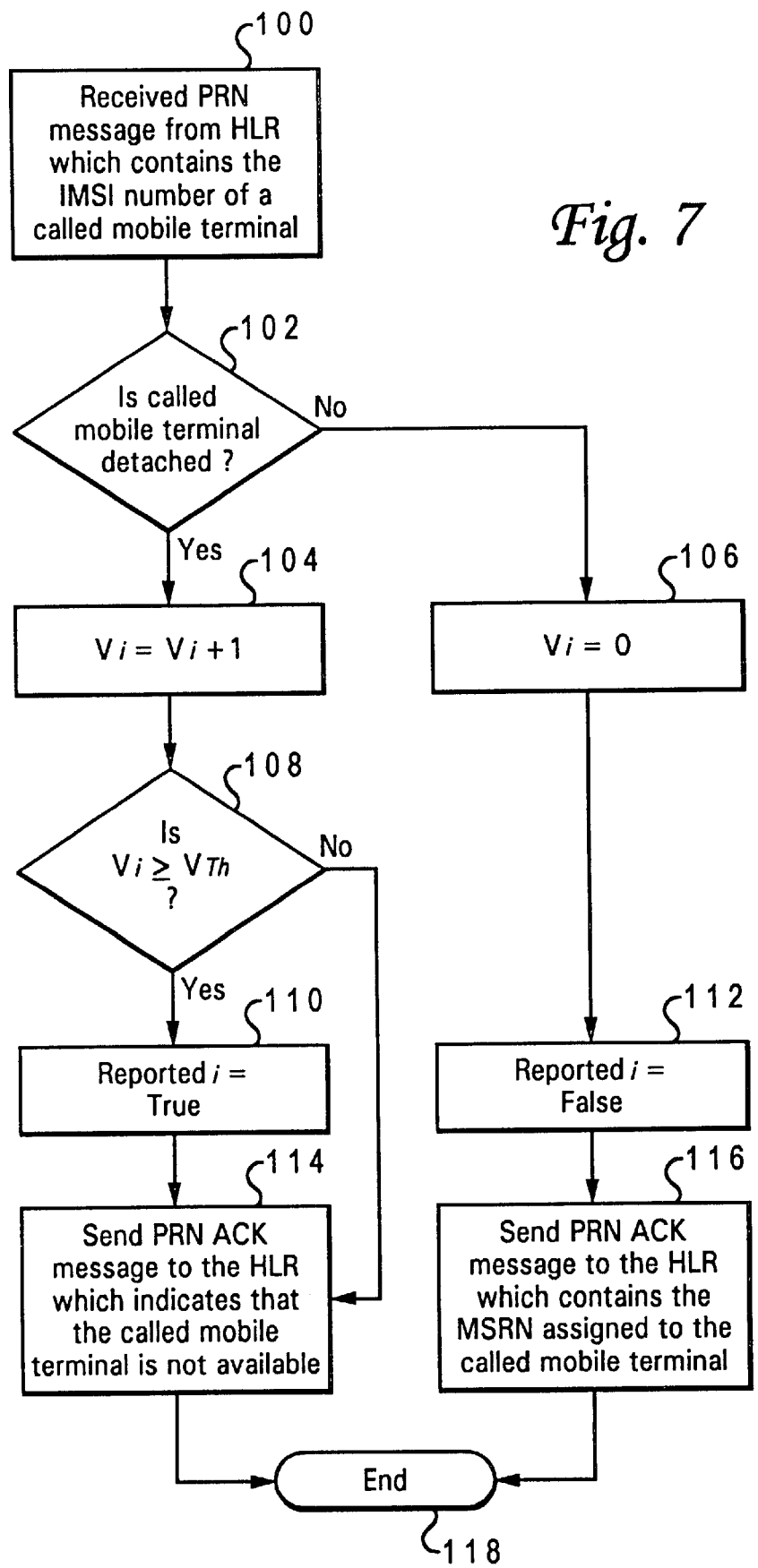
FIG. 7 is a flowchart illustrating the call delivery setup at the VMSC in accordance with the method of the present invention.

FIG. 5 describes the land-to-mobile call setup procedure in accordance with the present invention. In addition, FIGS. 4, 6 and 7 depict the flowcharts demonstrating the operation at the GMSC, HLR and VMSC, respectively, during a land-to-mobile call setup. In the following, we will describe the operations at the GMSC, HLR and VMSC during a land-to-mobile call setup with reference to FIGS. 4, 5, 6 and 7.

Referring now to FIGS. 4 and 5, there is depicted a flowchart and block diagram showing the signaling exchange for land-to-mobile call setup at the GMSC under the present invention. Referring to step 58 in FIG. 4, an Initial Address Message (IAM) message from the PSTN 6 is received at the GMSC 7 which contains a Mobile Subscriber integrated services digital network (ISDN) Number (shown as MSISDN1 13 in FIG. 5). Based on the GSM call setup procedure and shown in step 60, when a call for a particular mobile terminal arrives at the Gateway MSC 7 (GMSC), the GMSC 7 sends a Send Routing Information 20 (SRI) message to the HLR 11 which contains the MSISDN1 13 of the called mobile terminal. The process then proceeds to step 62 wherein the HLR 11 sends back and the GMSC 7 receives an SRI acknowledgement (SRI ACK) 30, as shown in FIG. 4. The GMSC 7 then checks in step 64 to see if the received SRI ACK 30 message contains a Mobile subscriber Roaming Number (MSRN) for the mobile terminal.

The MSRN is required for the GMSC 7 to route the call to the visiting MSC 23 (VMSC) of the mobile terminal. If an MSRN is contained in the SRI ACK 30 message, it is used as an ID to identify the called mobile terminal and as the routing address. An IAM 32 shown in FIG. 5 and shown in step 66 is sent by the GMSC 7 to the VMSC 23. A circuit is now established between the GMSC 7 and the VMSC 23 ending the process at step 70. However, if the SRI ACK 30 message does not contain a MSRN the process proceeds to step 69 wherein the SRI ACK 30 message is checked for a forwarding number for the mobile terminal. If no forward number exists the call fails and the process completes as shown in steps 67 and 70. If the SRI ACK 30 message contains a forwarding number, the call is forwarded and the process completes as shown in steps 68 and 70.

In accordance with a preferred embodiment of the present invention, for each subscriber, a "call-arrival-after-detach" counter is created, which records the number of call arrivals to the mobile terminal when the mobile terminal is detached from the network. For purposes of illustration only and as shown in FIG. 5, $C_i$ 15 will denote this counter in the following discussion, where the subscript i indicates that this counter is associated with a subscriber i. This counter is stored as part of the subscriber record in the HLR 11. The counter $C_i$ is incremented by 1 whenever an incoming call for subscriber i arrives and, at the same time, subscriber i is detached from the network. The counter $C_i$ is reset to zero as soon as the mobile terminal attaches to the GMSC network. Referring now to FIGS. 5 and 6, there is depicted a block diagram and a flowchart illustrating the method steps at the HLR in accordance with the present invention.

Once again, based on the GSM call setup procedure and shown in step 72, when a call for a particular mobile terminal arrives at the Gateway MSC 7 (GMSC), the. GMSC 7 sends a Send Routing Information 20 (SRI) message to the HLR 11 which contains the MSISDN1 13 of the called mobile terminal. The process then proceeds to step 74 wherein the HLR 11 checks to see if a condition referred hereinafter as Detach$_i$ 22 has been set equal to true, as will be more fully described below, indicating that the mobile terminal is detached, as detailed in FIGS. 2 and 3. If Detach$_i$ 22 is equal to true, this means that the mobile terminal has detached and the HLR 11 sends an SRI ACK message to the GMSC 7 indicating that the mobile terminal is not available, as shown in step 78. Additionally, if a call forwarding feature is active for the mobile terminal, the call forwarding number is sent as a parameter of the SRI ACK 30 message in step 80 to the GMSC 7 and the call is forwarded by the GMSC 7 when the GMSC 7 receives this forwarding number as shown in FIG. 5. This ends the process for this scenario as shown in step 82.

However, if in step 74 the HLR 11 determines that the condition Detach$_i$ 22 is not equal to true, then the VMSC 23 must be queried to continue with the call setup and the process continues to step 76. The HLR 11 then sends a Provide Roaming Number 26 (PRN) message to the VMSC 23 also referred to as the serving MSC for the mobile terminal. The PRN 26 message contains the IMSI of the mobile terminal as one of the parameters, as shown in step 76. The visiting MSC 23 then sends in step 84 a PRN ACK 28 message back to the HLR 11. At this point the PRN ACK 28 message is checked in step 86 at the HLR 11 to determine if it contains an MSRN for the mobile terminal. If the PRN ACK 28 message contains an MSRN, the visiting MSC 23 has allocated a MSRN since the mobile terminal is attached and has sent the PRN ACK 28 message back to the HLR 11 together with the assigned MSRN. The HLR 11 then forwards the VMSC MSRN in step 88 to the GMSC 7 through a SRI ACK 30 message. The GMSC 7 routes the call to the VMSC 23 by an Initial Address Message (IAM) 32 using this MSRN as the routing number. Since the mobile terminal is attached, the $C_i$ counter is set equal to zero and the Detach$_i$ 22 condition in the HLR 11 is set equal to false and the process ends, as shown in steps 90 and 92 until the next call for the mobile terminal is received. If the PRN ACK 28 message in step 86 does not contain an MSRN, the visiting MSC 23 has not allocated a MSRN since the mobile terminal is detached. Since subscriber i has detached from the network, the counter $C_i$ is incremented by one in step 94 thereby collecting information when an incoming call for subscriber i arrives and is detached from the network. The counter is then checked in step 96 to see if it is greater than a threshold value $C_{th}$. This threshold value is determined by utilizing optimization studies that takes into consideration various cost parameters, and the attach/detach and call arrival behavior of the particular subscriber or of the general subscriber population. If the counter $C_i$ is less than $C_{th}$, the process continues to steps 78 to 82 as described above. If the counter Ci is greater than or equal to $C_{th}$, the process sets the Detach$_i$ 22 condition to be true in step 98 and then proceeds through steps 78 and 82 as described above. This handles the case when the mobile terminal has received $C_{th}$ or more calls after detaching.

Referring now to FIG. 7, there is illustrated a more detailed flowchart for the process depicted in FIG. 5 for the VMSC 23. In accordance with another preferred embodiment of the present invention, for each subscriber, another "call-arrival-after-detach" counter is created at the VMSC 23 which records the number of call arrivals to the mobile terminal when the mobile terminal is detached from the network. For purposes of illustration only, $V_i$ will denote this counter in the following discussion, where once again the subscript i indicate that this counter is associated with a subscriber i. This counter is stored as part of the subscriber record in the VLR 19. Referring now to step 100 in FIG. 7, the VMSC 23 receives the PRN 26 message from the HLR 11 which contains the IMSI number of a called mobile terminal. The VMSC 23 in step 102 then determines if the mobile terminal has detached as described above in FIGS. 2 and 3. If the mobile terminal has not detached then the counter $V_i$ is set equal to zero. The process the proceeds to step 112 to set a condition at the VMSC 23 referred to as Reported$_i$ for indicating what type of reported condition the VMSC 23 will forward to the HLR 11. Since the mobile terminal is attached, the reported condition, Reported$_i$, is set to false. Reported, equal to false indicates that the HLR 11 has not setup a cache entry that contains the attach/detach status of the mobile terminal 8. The Reported$_i$ condition is used to determine whether the HLR 11 should be informed when the mobile terminal 8 attaches to the network again, as will be more fully described below. The VMSC 23 then sends the PRN ACK 28 message to the HLR 11 which contains the MSRN assigned to the mobile terminal as described above in FIGS. 5 and 6 and ends, as shown in steps 116 and 112 of FIG. 7.

However if the mobile terminal is detached in step 102, then counter $V_i$ information is to collected as shown in the next step 104. The counter $V_i$ is incremented by 1whenever an incoming call for subscriber i arrives at the VMSC 23 and, at the same time, subscriber i is detached from the network. Similar to the procedure at the HLR 11, the counter $V_i$ is then checked in step 108 to see if it is greater than a threshold value $V_{th}$. This threshold value is also determined by utilizing optimization studies that takes into consideration various cost parameters, and the attach/detach and call arrival behavior of the particular subscriber or of the general subscriber population. For a given mobile terminal, the condition $V_i$ greater than or equal to $V_{th}$ must be true and if the counter $V_i$ is less than $V_{th}$, the VMSC 23 sends the PRN ACK 28 message to the HLR 11 indicating that the called mobile terminal is not available completing its operation, as shown in steps 114 and 118. However, If the counter Vi is greater than or equal to $V_{th}$, the process sets the Reported$_i$ condition to be true in step 110 and then sends the PRN ACK 28 message to the HLR 11 indicating that the called mobile terminal is not available, completing its operation, as shown once again in steps 114 and 118.

Figure 9:
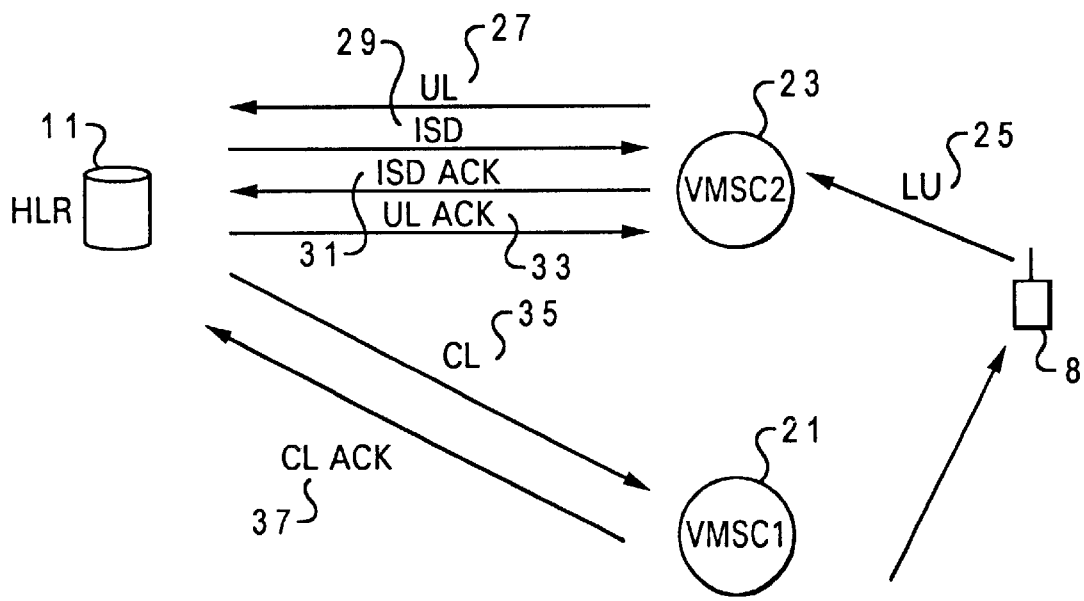
FIG. 9 is a detailed block diagram showing attach procedure when a mobile terminal moves to a new service area under the GSM standard.
Figure 8:
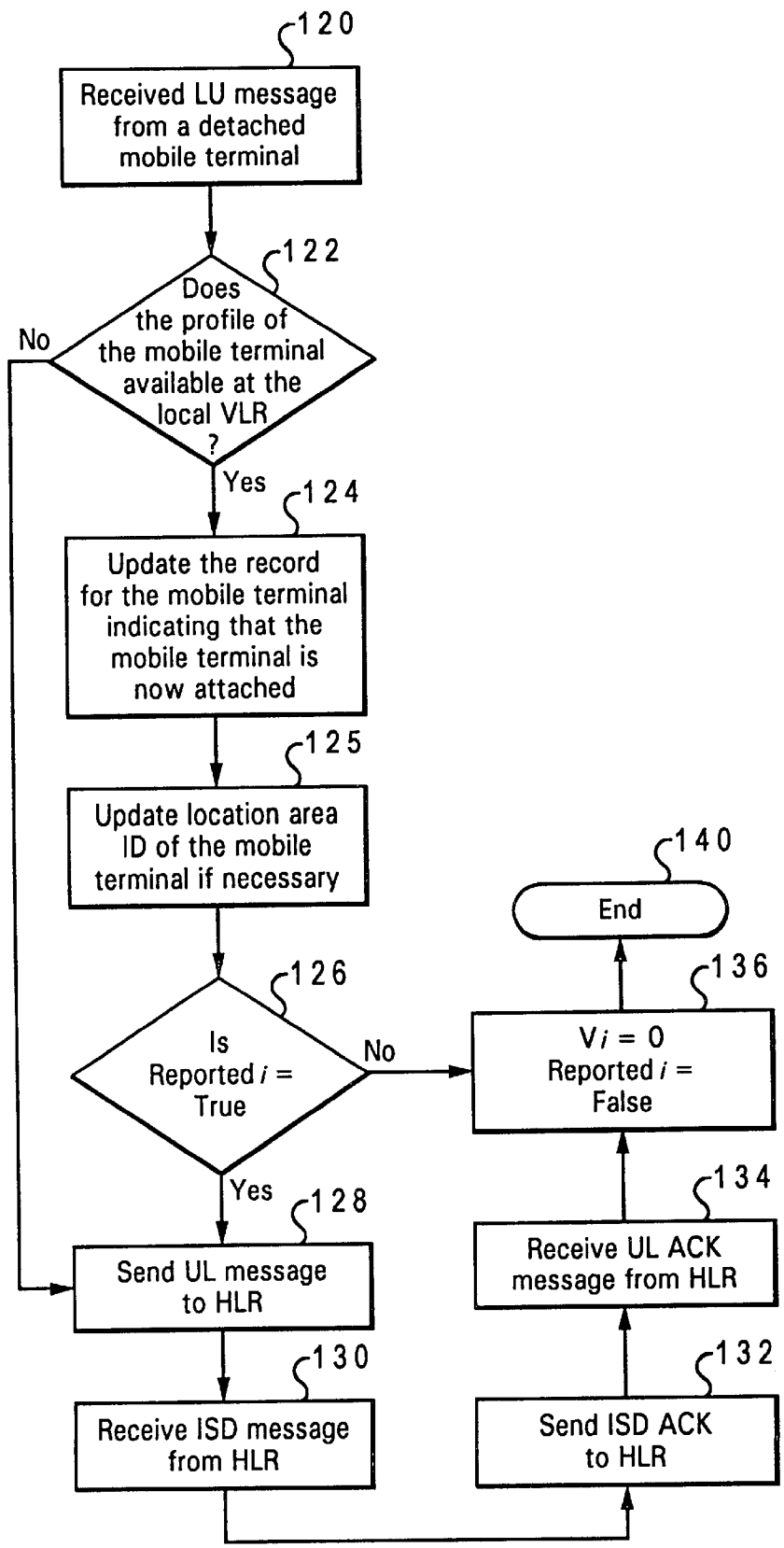
FIG. 8 is a flowchart illustrating the operations at the VMSC when the mobile terminal attaches to the GMSC network in accordance with the method of the present invention.

Referring now to FIGS. 8 and 9, there is depicted a flowchart and a block diagram for the location update procedure when a mobile terminal 8 reattaches to the GSM network 23 in accordance with the method of the present invention. When a mobile terminal 8 is turned on by a subscriber, it reattaches to the network by sending a Location Update (LU) 25 message in step 120 to the VMSC 23 serving its current cell through the GSM air channel, BTS 14 and BSC 16. The VMSC 23 then checks in step 122 whether the profile of the mobile terminal 8 is available at the local VLR 19. If the profile of the mobile terminal 8 is available, then the record at the VLR 19 for the VMSC 23 is updated indicating that the mobile terminal is now attached, as shown in step 124. Additionally, the process continues to step 125 to update the location area ID of the mobile terminal if necessary. Next, the condition Reported$_i$ is checked in step 126 to determine if it has been set to true, indicating that the detach status of this mobile terminal 8 has been cached at the HLR 11. If the condition Reported$_i$ is false, the process proceeds to step 136 wherein the V$_i$ counter is set equal to zero and the condition Reported$_i$ is set equal to false, completing the process at step 140 until the mobile terminal is once again detached.

Turning once again to FIGS. 8 and 9, if in either step 122 the profile of the mobile terminal 8 is not located at the local VLR 19 or the condition Reported$_i$ is true in step 126, the process proceeds to step 128. As shown in step 128 of FIG. 8, the VMSC 23 sends an Update Location (UL) 27 message to the HLR 11 of the mobile terminal 8. The HLR 11 performs the location update procedure as described later in FIG. 10 and sends in step 130 an Insert Subscriber Data (ISD) 29 message to the VMSC 23. This ISD 29 message contains a copy of the mobile terminal's subscriber profile. On receiving this ISD 29 message, the VMSC 23 stores the subscriber profile in its associated VLR 13 and sends in step 132 an ISD ACK 31 message to the HLR 11. The HLR 11 then sends a UL ACK 33 to be received in step 134 by the VMSC 23. This location update procedure informs the HLR 11 that the mobile terminal has reattached to the network and allows the HLR 11 to keep track of the up-to-date VMSC ID of each of its supported mobile terminals if have moved to another VMSC since last attached. The process then proceeds to step 136 wherein the V$_i$ counter is set equal to zero and the condition Reported$_i$ is set equal to false completing the process at 140 until the mobile terminal is once again detached.

Figure 10:
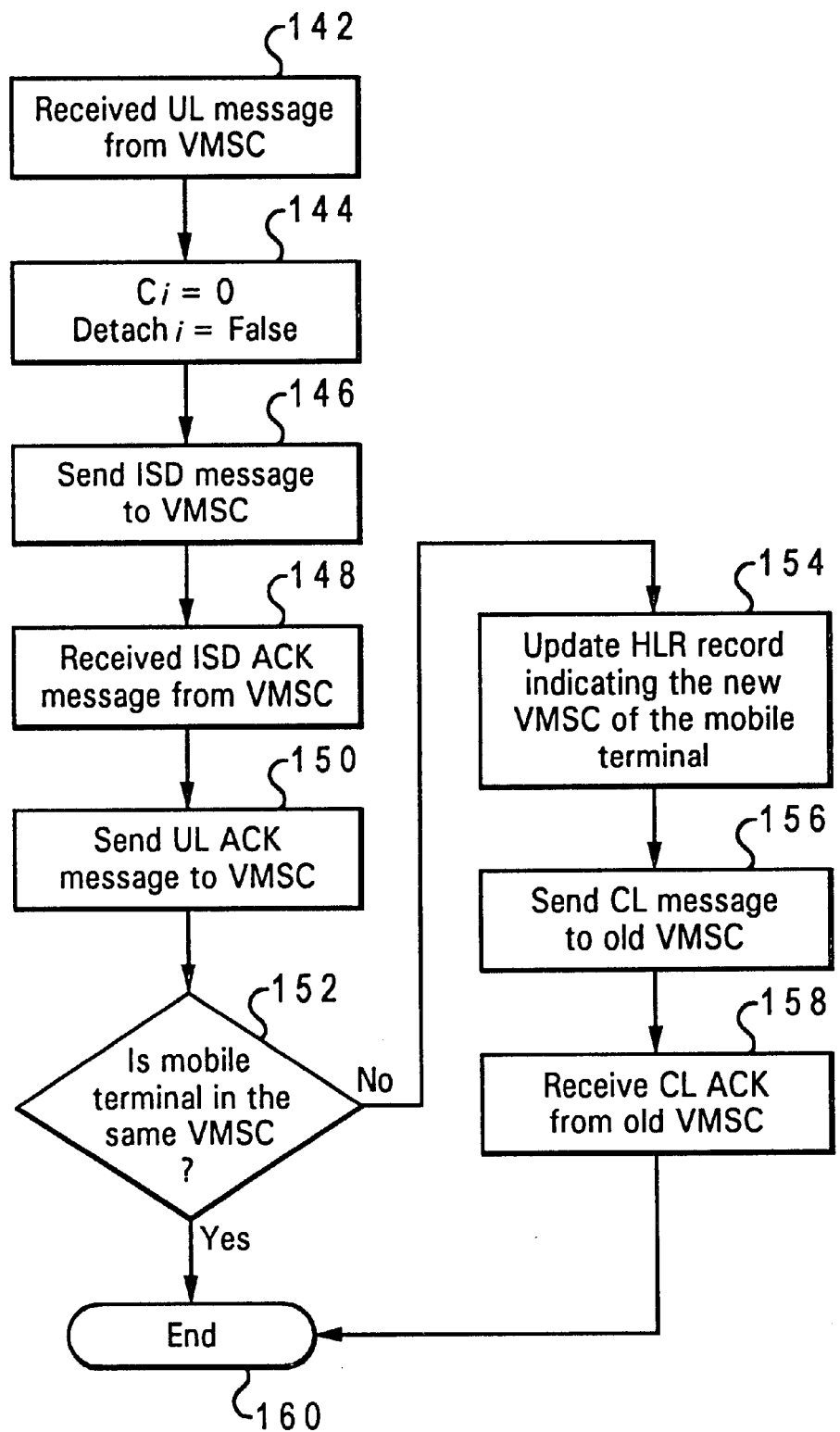
FIG. 10 is a flowchart illustrating the operations at the HLR when the mobile terminal attaches to the GSM network in accordance with the method of the present invention.

Referring now to FIGS. 10 and 9, there is depicted a flowchart and a block diagram for the location update procedure at the HLR 11 when a mobile terminal reattaches to the network or when it moves from the service area of VMSC 1 21 to that of VMSC 2 23. When a mobile terminal 8 reattaches to the network or when it detects that it is in a new location area (LA), it will send a Location Update (LU) 25 message to the MSC 23 serving that LA through the GSM air channel, BTS 14 and BSC 16. If an inter LA movement has occurred and if the mobile terminal 8 remains in the same VMSC 21, the VMSC 21 simply updates its associated VLR 13 indicating the new LA of the mobile terminal 8 and the location update procedure is complete. If the mobile terminal 8 reattaches at the network after a previous detach and the Reported$_i$ condition at the VMSC is true (as described before) or if the mobile terminal 8 has moved to a new VMSC 23, the VMSC 23 sends in step 142 of FIG. 10 an Update Location (UL) 27 message to the HLR 11 of the mobile terminal 8. The mobile terminal is now reattached and the C$_i$ counter is set to zero and the Detach$_i$ 22 condition is set to false. The HLR 11 updates its record indicating the new VMSC 23 of the mobile terminal 8 and sends in step 146 an Insert Subscriber Data (ISD) 29 message to this new VMSC 23. This ISD 29 message contains a copy of the mobile terminal's subscriber profile. On receiving this ISD 29 message, the VMSC 23 stores the subscriber profile in its associated VLR 13 and sends in step 148 an ISD ACK 31 message to the HLR 11. The HLR 11 then sends in step 150 a UL ACK 33 to the VMSC 23. The process then continues with the HLR determining in step 152 if the mobile terminal is in the same VMSC and if it is the process completes at step 160. However, if the mobile terminal is in a different VMSC, the HLR 11 updates its record in step 154 indicating the new VMSC 23 of the mobile terminal 8 and sends in step 156 a Cancel Location (CL) 35 message to the previous VMSC 21 of the mobile terminal 8. The previous VMSC 21 then deletes the subscriber profile for the mobile terminal 8 and sends in step 158 a CL ACK 37 message to the HLR 11 ending the process at the HLR 11 in step 160. This location update procedure allows the HLR 11 to keep track of the up-to-date VMSC ID of each of its supported mobile terminals.

Figure 11:
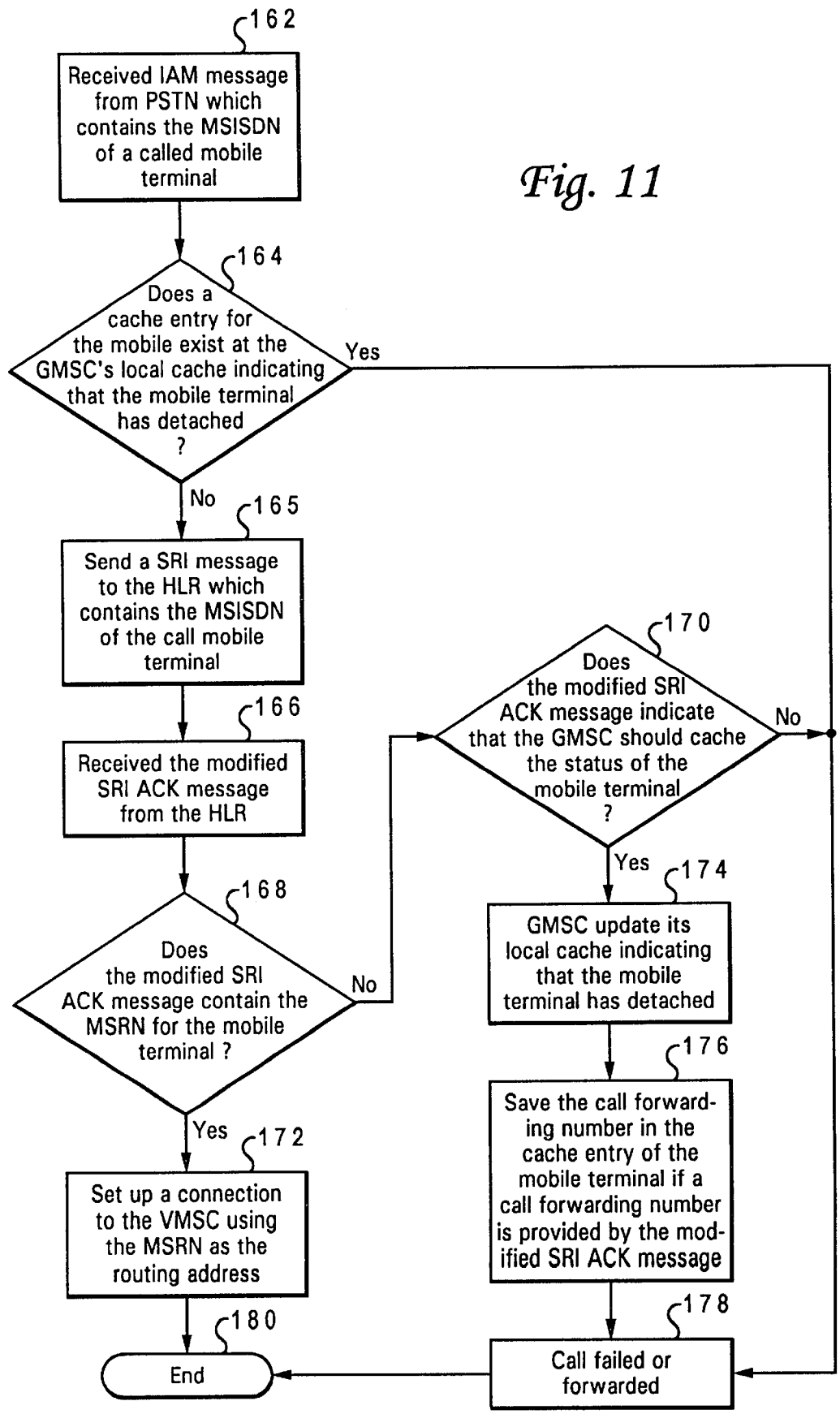
FIG. 11 is a flowchart illustrating the call delivery operations at the GMSC with GMSC caching in accordance with the method of the present invention.

Referring now to FIG. 11 there is depicted a flowchart for a call delivery method of the present invention if the GMSC 7 is capable of caching information about the mobile terminal. Referring to step 162 in FIG. 11, an Initial Address Message (IAM) message from the PSTN 6 is received at the GMSC 7 which contains a Mobile Subscriber integrated services digital network (ISDN) Number (shown above as MSISDN1 13 in FIG. 5) of a called mobile terminal 8. The GMSC 7 then checks its cache entries to see whether or not it has an entry indicating that the mobile terminal 8 has detached. If a cache entry indicates that the mobile terminal 8 has detached, then the process completes at step 178 in that the call has failed due to a detached mobile terminal 8. The call is forwarded if the GMSC cache contains a call forwarding number. However, if no cache entry is found, the GMSC 7 sends in step 165 a Send Routing Information 20 (SRI) message to the HLR 11 which contains the MSISDN1 13 of the called mobile terminal. The process then proceeds to step 166 wherein the HLR 11 sends back and the GMSC 7 receives a modified SRI acknowledgement (SRI ACK) 30. The modified SRI ACK message is similar to the SRI ACK message as defined in the GMSC standard except that the modified SRI ACK message is capable of informing the GMSC whether it should cache the information of the mobile terminal. The GMSC 7 then checks in step 168 to see if the received modified SRI ACK 30 message contains a Mobile Subscriber Roaming Number (MSRN) for the mobile terminal 8. If it does, the GMSC 7 sets up a connection to the VMSC 23 using the MSRN as the routing address in step 172 thereby completing the process in step 180.

Turning once again to FIG. 11, if the SRI ACK 30 message does not contain an MSRN for the called mobile terminal 8, the GMSC determines from the modified SRI ACK 30 whether the GMSC should cache the status of the mobile terminal 8. If the modified SRI ACK 30 message does not indicate the GMSC 7 to cache, the process completes at steps 178 and 180 with the call failed. The call is forwarded if the received modified SRI ACK message contains a call forwarding number. If the modified SRI ACK 30 message indicates that the GMSC 7 should cache, the process proceeds to step 174 wherein the GMSC 7 updates its local cache indicating that the mobile terminal has detached. If a call forwarding number is provided by the modified SRI ACK 30 message, the GMSC 7 also in step 176 saves the call forwarding number in the cache entry for the mobile terminal 8. The process then completes with the call being either forwarded if a call forwarding number is available or failed as shown in steps 178 and 180.

Figure 12:
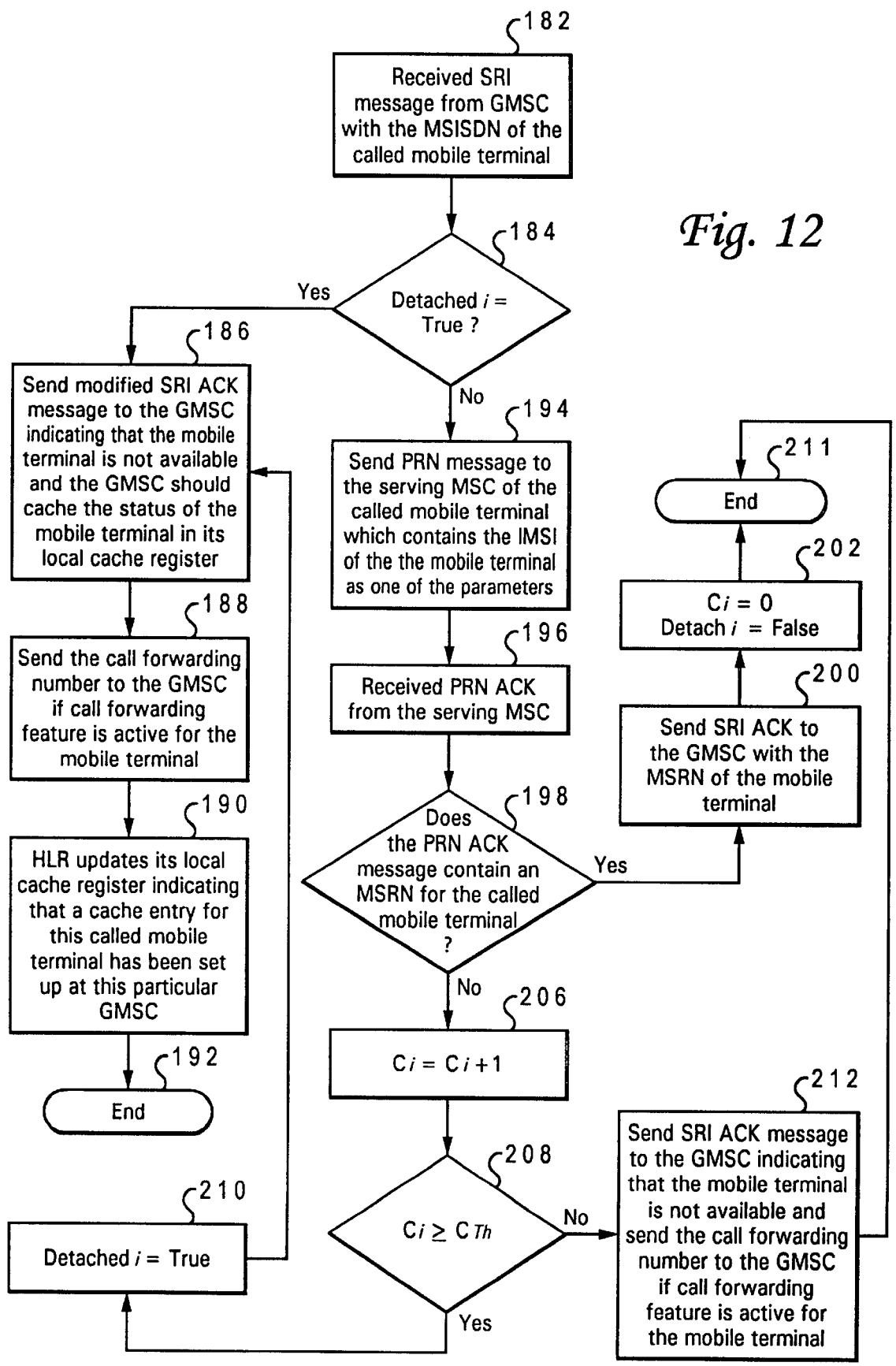
FIG. 12 is a flowchart illustrating the call delivery operations at the HLR with GMSC caching in accordance with the method of the present invention.

Referring now to FIG. 12 there is depicted a flowchart for a call delivery method of the present invention with the HLR 11 sending cache information about the mobile terminal 8 to the GMSC 7. Once again, based on the GSM call setup procedure and shown in step 182, when a call for a particular mobile terminal arrives at the Gateway MSC 7 (GMSC), the GMSC 7 sends a Send Routing Information 20 (SRI) message to the HLR 11 which contains the MSISDN1 13 of the called mobile terminal. The process then proceeds to step 184 wherein the HLR 11 checks to see if the condition Detach$_i$ 22 is equal to true, indicating that the mobile terminal is detached as detailed above in FIGS. 2 and 3. If the mobile terminal has detached the HLR 11 sends an SRI ACK 30 message to the GMSC indicating that the mobile terminal is not available and that the GMSC 7 should cache the status of the mobile terminal 8 in its local cache register, as shown in step 186. Additionally, if a call forwarding feature is active for the mobile terminal 8, the call forwarding number is sent as a parameter of the SRI ACK message in step 188 to the GMSC and the call is forwarded as shown in FIG. 11. The HLR 11 then updates its local cache in step 190 indicating that a cache entry for this called mobile terminal 8 has been set up at this particular GMSC 7. This ends the process for this scenario as shown in step 192.

However, if in step 184 the HLR 11 sees that the condition Detach$_i$ 22 is not equal to true, this indicates that the mobile terminal is attached and the process continues to step 194. The HLR 11 then sends a Provide Roaming Number 26 (PRN) message to the VMSC 23 also referred to as the serving MSC for the mobile terminal. The PRN 26 message contains the IMSI of the mobile terminal as one of the parameters, as shown in step 194. The visiting MSC 23 then sends in step 196 a PRN ACK 28 message back to the HLR 11. At this point the PRN ACK 28 message is checked in step 198 at the HLR 11 to see if it contains an MSRN for the mobile terminal. If the PRN ACK 28 message contains an MSRN, the visiting MSC 23 has allocated a MSRN since the mobile terminal is attached and has sent the PRN ACK 28 message back to the HLR 11 together with the assigned MSRN. The HLR 11 then forwards this MSRN in step 200 to the GMSC 7 through a SRI ACK 30 message. The GMSC 7 routes the call to the VMSC 23 by an Initial Address Message (IAM) 32 using this MSRN as the routing number. Since the mobile is attached, the $C_i$ counter is set equal to zero and the Detach$_i$ 22 condition in the HLR 11 is set equal to false, as shown in step 202. The process then ends at step 211. If the PRN ACK 28 message in step 196 does not contain an MSRN, the visiting MSC 23 has not allocated a MSRN since the mobile terminal is detached. Since subscriber i has detached from the network, the counter $C_i$ is incremented by one in step 206 thereby collecting information when an incoming call for subscriber i arrives and is detached from the network. The counter is then checked in step 208 to see if it is greater than a threshold value $C_{th}$. Once again the threshold value is determined by utilizing optimization studies that takes into consideration various cost parameters, and the attach/detach and call arrival behavior of the particular subscriber or of the general subscriber population. If the counter $C_i$ is less than $C_{th}$, the process continues to step 212 as described above. If the counter $C_i$ is greater than or equal to $C_{th}$, the process sets the Detach$_i$ 22 condition to be true in step 210 and then proceeds through steps 186 through 192 as described above.

Figure 13:
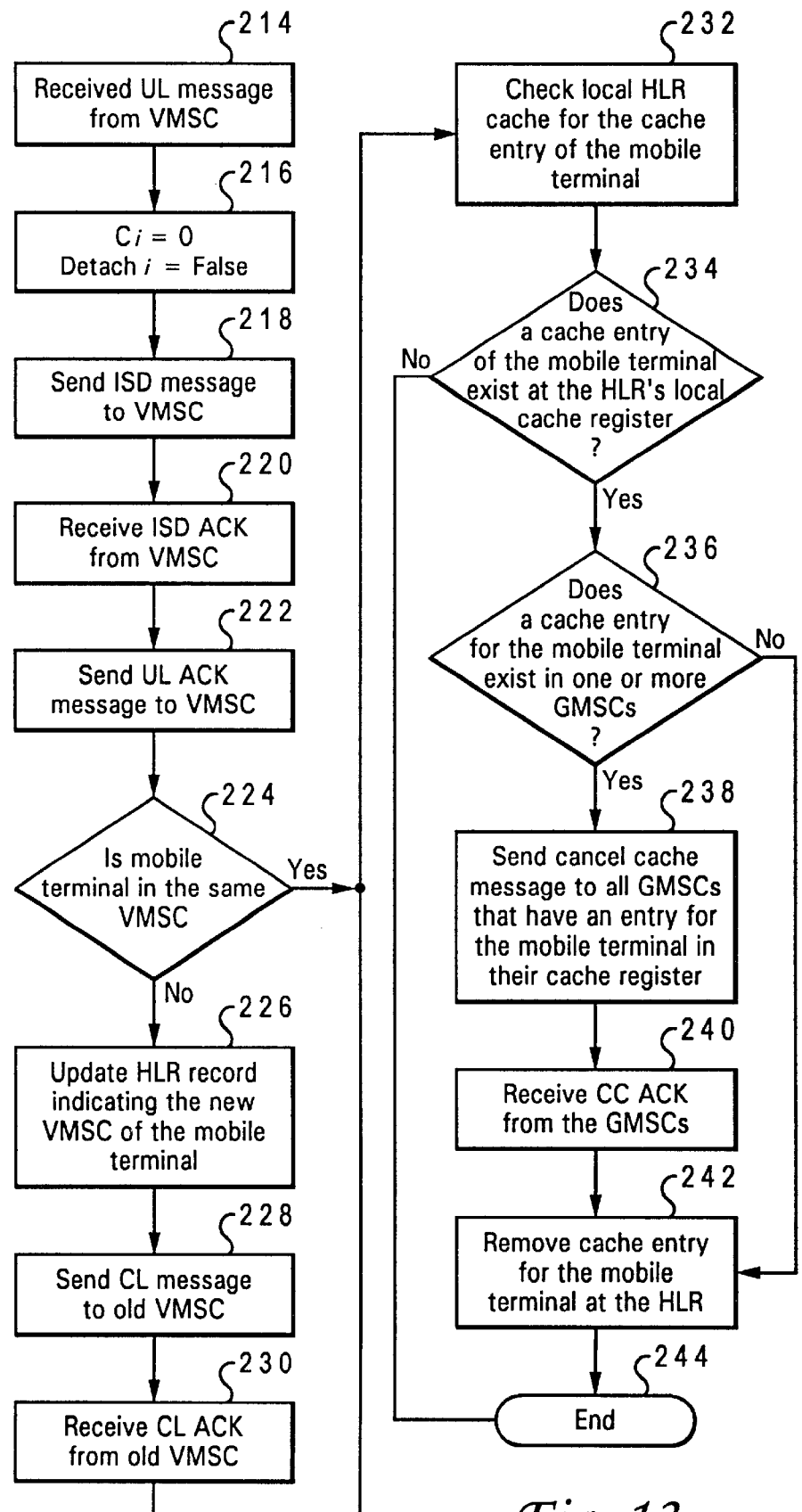
FIG. 13 is a flowchart illustrating the operations at the HLR with GMSC caching when the mobile terminal attaches to the GSM network in accordance with the method of the present invention.

Referring now to FIG. 13, there is depicted a flowchart for the procedure at the HLR 11 when the HLR 11 receives a UL message from the VMSC based on the present invention if the GMSC is capable of caching information about a detached mobile terminal 8. If the mobile terminal 8 reattaches to the VMSC 23, the VMSC 23 sends in step 214 an Update Location (UL) 27 message to the HLR 11 of the mobile terminal 8. The mobile terminal is now reattached and the $C_i$ counter is set to zero and the Detach$_i$ 22 condition is set to false as shown in step 216. The HLR 11 updates its record and sends in step 218 an Insert Subscriber Data (ISD) 29 message to the VMSC 23. This ISD 29 message contains a copy of the mobile terminal's subscriber profile. On receiving this ISD 29 message, the VMSC 23 stores the subscriber profile in its associated VLR 13 and sends in step 220 an ISD ACK 31 message to the HLR 11. The HLR 11 then sends in step 222 a UL ACK 33 to the VMSC 23. The process then continues with the HLR determining in step 224 if the mobile terminal is in the same VMSC and if it isn't, the HLR 11 updates its record in step 226 indicating the new VMSC 23 of the mobile terminal 8 and sends in step 228 a Cancel Location (CL) 35 message to the previous VMSC 21 of the mobile terminal 8. The previous VMSC 21 then deletes the subscriber profile for the mobile terminal 8 and sends in step 230 a CL ACK 37 message to the HLR and the process proceeds to step 232. If in step 224 the mobile terminal 8 is in the same VMSC the process also continues to step 232. This location update procedure allows the HLR 11 to once again keep track of the up-to-date VMSC ID of each of its supported mobile terminals.

Figure 14:
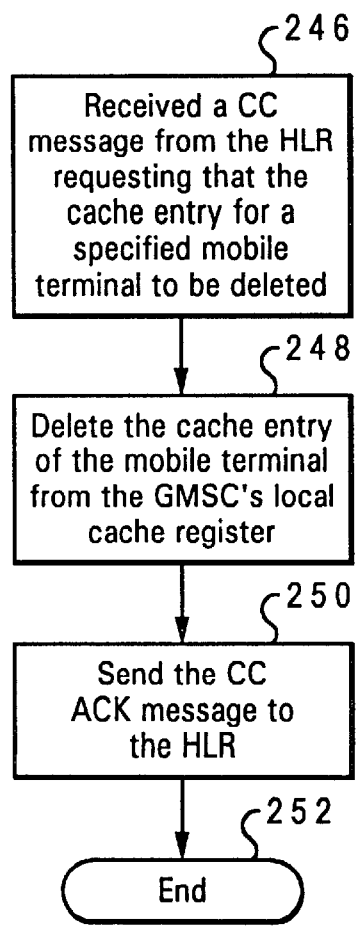
FIG. 14 is a flowchart illustrating the operations at the GMSC with GMSC caching when the mobile terminal attaches to the GSM network in accordance with the method of the present invention.

Turning once again to FIG. 13, The HLR 11 checks to see if it has a cache entry in step 232 for the mobile terminal 8. More specifically, in step 234 the HLR 11 determines if a cache entry of the mobile terminal 8 exists at the HLR's local cache register. If no entry exists the process ends at step 244. If an entry exists then the HLR 11 further determines in step 236 if the cache entry exists in one or more GMSCs. If no cache entry exists for any GMSC 7, the process proceeds to step 242 wherein the HLR 11 removes the cache entry for the mobile terminal at the HLR 11 and the process ends at step 244. However, if an entry exists for one or more GMSCs, the HLR 11 sends a cancel cache (referred to as a CC) message to all GMSCs that have an entry for the mobile terminal in their cache registers, as shown in step 238. The CC is a proprietary message that is similar to the cancel location message as defined in the GSM Standard. The HLR 11 then receives a CC ACK from the GMSCs in step 240 and the process completes by performing step 242 as described above. Referring now to FIG. 14, there is depicted a flowchart for cancel caching at the GMSC 7. When the GMSC 7 receives a cancel caching or CC message from the HLR 11 in step 246, the CC message contains a request that a cache entry at the GMSC 7 for a specified mobile terminal 8 be deleted. The process then proceeds by the GMSC's deleting in step 248 the cache entry of the mobile terminal 8 from their local cache entries. The process completes in steps 250 and 252 by the GMSCs sending a CC ACK message to the HLR 11.

In accordance with the teachings of the present invention, the described call delivery/forwarding procedure is to be used only when there is a high probability that several calls will arrive during the time when subscriber i has detached. The call delivery/forwarding method of the present invention is enabled at the HLR 11 when the $C_i$ counter of the subscriber exceeds a given threshold value.

Otherwise, the standard GSM call deliver/forwarding procedures described above will be used.

As has been described, the present invention provides a method and system that results in lower processing overhead costs at the HLR and at the VMSC for those subscribers that receive a number of incoming calls after he/she has detached from the network. However, if the subscriber frequently detaches and re-attaches to the network while not receiving enough calls between each pair of detach and attach, the method of the present invention may result in higher processing cost to the HLR and the VMSC. It is therefore important to selectively enable/disable the method on a per subscriber basis based by selecting the appropriate threshold values, $V_{th}$ and $C_{th}$, based on the call arrival characteristics of the subscriber. Depending on the implementation, the threshold values may be selected on a per user basis such that each mobile terminal has its unique threshold values, $V_{th}$ and $C_{th}$. As an alternative, all mobile terminals may use the same threshold values. In addition, the proposed call setup method may be disabled by setting the threshold values to infinity.

It is also important to note that although the present invention has been described in the context of a fully functional method for reducing call setup costs by determining when to forward calls or indicate a failed call for a detached mobile terminal, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for reducing call setup costs for mobile communications networks when processing calls for mobile terminals of one or more subscribers at a home location register received from a gateway mobile switching center, comprising the steps of:

determining at a home location register if a mobile terminal for a subscriber has detached from a visiting mobile switching center, including determining at said home location register if a condition $Detach_i$ is true; and responsive to said determination that said mobile terminal has not detached, further determining if subsequent calls for said mobile terminal should be forwarded to said visiting mobile switching center by said home location register based on call arrival characteristics for said subscriber, including caching said determining information at said gateway mobile switching center for use by said gateway mobile switching center in determining to forward incoming calls for said mobile terminal to said home location register.

2. The method for reducing call setup cost for mobile communications networks according to claim 1, wherein said determining at a home location register if a mobile terminal for a subscriber has detached further includes:

responsive to said determination that said condition $Detach_i$ is true, sending a Send Routing Information Acknowledgment to said gateway mobile switching center indicating that said mobile terminal is not available and sending a call forwarding number when a call forwarding feature is active to said gateway mobile switching center.

3. The method for reducing call setup cost for mobile communications networks according to claim 1, wherein responsive to said determination if subsequent calls for said mobile terminal should be forwarded, further comprising the steps of:

determining at said home location register if a Provide Roaming Number Acknowledgment received from said visiting mobile switching center when said condition $Detach_i$ is false contains a Mobile Subscriber Roaming Number for said mobile terminal; and responsive to said determination that said Provide Roaming Number Acknowledgment contains said Mobile Subscriber Roaming Number, sending a Send Routing Information Acknowledgment to said gateway mobile switching center indicating that said mobile terminal is available and setting a "detach after arrival counter" $C_i$ equal to zero and said condition $Detach_i$ equal to false.

4. The method for reducing call setup cost for mobile communications networks according to claim 1, wherein responsive to said determination if subsequent calls for said mobile terminal should be forwarded, further comprising the steps of:

determining at said home location register if a Provide Roaming Number Acknowledgment received from said visiting mobile switching center when said condition $Detach_i$ is false contains a Mobile Subscriber Roaming Number for said mobile terminal; and responsive to said determination that said Provide Roaming Number Acknowledgment does not contain said Mobile Subscriber Roaming Number, incrementing by one a "detach after arrival counter" $C_i$.

5. The method for reducing call setup cost for mobile communications networks according to claim 4, wherein responsive to said determination that said Provide Roaming Number Acknowledgment does not contain said Mobile Subscriber Roaming Number, further comprising the steps of:

comparing said "detach after arrival counter" $C_i$ against a threshold counter $C_{th}$ wherein if said $C_i$ is less than $C_{th}$ sending a Send Routing Information Acknowledgment to said gateway mobile switching center indicating that said mobile terminal is not available and sending a call forwarding number when a call forwarding feature is active; and setting said condition $Detach_i$ equal to true when said $C_i$ is greater than or equal to $C_{th}$ and sending a Send Routing Information Acknowledgment to said gateway mobile switching center indicating that said mobile terminal is not available and sending a call forwarding number when a call forwarding feature is active to said gateway mobile switching center.

6. The method for reducing call setup cost for mobile communications networks according to claim 1, wherein said determining at said home location register if said mobile terminal for said subscriber has detached from said visiting mobile switching center, further comprises the steps of:

setting a "detach after arrival counter" $V_i$ at said visiting switching mobile center equal to zero when said mobile terminal is attached and setting a condition $Reported_i$ equal to false and sending a Provide Roaming Number Acknowledgment from said visiting mobile switching center to said home location register containing a Mobile Subscriber Roaming Number.

7. The method for reducing call setup cost for mobile communications networks according to claim 1, wherein said determining at said home location register if said mobile terminal for said subscriber has detached from said visiting mobile switching center, further comprises the step of:

incrementing by one a "detach after arrival counter" $V_i$ at said visiting mobile switching center when a call for said mobile terminal arrives at said visiting mobile switching center and said mobile terminal is detached.

8. The method for reducing call setup cost for mobile communications networks according to claim 7, wherein incrementing by one said "detach after arrival counter" $V_i$ further comprising the steps of:

comparing said "detach after arrival counter" $V_i$ against a threshold counter $V_{th}$ wherein if said $V_i$ is less than $V_{th}$ sending a Provide Roaming Number Acknowledgment from said visiting mobile switching center to said home location register indicating that said mobile terminal is not available; and setting said condition Reported$_i$ equal to true when said $V_i$ is greater than or equal to $V_{th}$ and sending said Provide Roaming Number Acknowledgment from said visiting mobile switching center to said home location register indicating that said mobile terminal is not available.

9. An information handling system for reducing call setup cost for mobile communications networks, comprising:

means for determining at a home location register if a mobile terminal for a subscriber has detached from a visiting mobile switching center, including means for determining at said home location register if a condition Detach$_i$ is true;

means for determining if subsequent calls for said mobile terminal should be forwarded to said visiting mobile switching center by said home location register based on call arrival characteristics for said subscriber in response to said mobile terminal not being detached; and means for caching attach/detach mobile terminal information at a gateway mobile switching center for use by said gateway mobile switching center in determining to forward incoming calls for said mobile terminal to said home location register.

10. The information handling system for reducing call setup cost for mobile communications networks according to claim 9, further comprising:

means for sending a Send Routing Information Acknowledgment to said gateway mobile switching center indicating that said mobile terminal is not available and means for sending a call forwarding number when a call forwarding feature is enabled to said gateway mobile switching center when said determination that said condition Detach$_i$ is true.

11. The information handling system for reducing call setup cost for mobile communications networks according to claim 9, further comprising:

means for determining at said home location register if a Provide Roaming Number Acknowledgment received from said visiting mobile switching center when said condition Detach$_i$ is false contains an Mobile Subscriber Roaming Number for said mobile terminal; and means for sending a Send Routing Information Acknowledgment to said gateway mobile switching center indicating that said mobile terminal is available and means for setting a "detach after arrival counter" $C_i$ equal to zero and said condition Detach$_i$ equal to false when said determination that said Provide Roaming Number Acknowledgment contains said Mobile Subscriber Roaming Number.

12. The information handling system for reducing call setup cost for mobile communications networks according to claim 9, further comprising:

means for determining at said home location register if a Provide Roaming Number Acknowledgment received from said visiting mobile switching center when said condition Detach$_i$ is false contains a Mobile Subscriber Roaming Number for said mobile terminal; and means for incrementing by one a "detach after arrival counter" $C_i$ when said determination that said Provide Roaming Number Acknowledgment does not contain said Mobile Subscriber Roaming Number.

13. The information handling system for reducing call setup cost for mobile communications networks according to claim 12, further comprising:

means for comparing said "detach after arrival counter" $C_i$ against a threshold counter $C_{th}$ wherein if said $C_i$ is less than $C_{th}$, means for sending a Send Routing Information Acknowledgment to said gateway mobile switching center indicating that said mobile terminal is not available and means for sending a call forwarding number when a call forwarding feature is active; and means for setting said condition Detach$_i$ equal to true when said $C_i$ is greater than or equal to $C_{th}$ and means for sending a Send Routing Information Acknowledgment to said gateway mobile switching center indicating that said mobile terminal is not available and means for sending a call forwarding number when a call forwarding feature is active to said gateway mobile switching center.

14. The information handling system for reducing call setup cost for mobile communications networks according to claim 9, further comprising:

means for setting a "detach after arrival counter" $V_i$ at said visiting switching mobile center equal to zero when said mobile terminal is attached, means for setting a condition Reported$_i$ equal to false and means for sending a Provide Roaming Number Acknowledgment from said visiting mobile switching center to said home location register containing a Mobile Subscriber Roaming Number.

15. The information handling system for reducing call setup cost for mobile communications networks according to claim 9, further comprising:

means for incrementing by one a "detach after arrival counter" $V_i$ at said visiting switching mobile center when a call for the mobile terminal arrives at the VMSC and said mobile terminal is detached.

16. The information handling system for reducing call setup cost for mobile communications networks according to claim 15, further comprising:

means for comparing said "detach after arrival counter" $V_i$ against a threshold counter $V_{th}$ wherein if said $V_i$ is less than $V_{th}$, means for sending a Provide Roaming Number Acknowledgment from said visiting mobile switching center to said home location register indicating that said mobile terminal is not available; and means for setting said condition Reported$_i$ equal to true when said $V_i$ is greater than or equal to $V_{th}$ and means for sending said Provide Roaming Number Acknowledgment from said visiting mobile switching center to said home location register indicating that said mobile terminal is not available.

17. The information handling system for reducing call setup cost for mobile communications networks according to claim 9, further comprising:

means for clearing said caching attach/detach mobile terminal information at said gateway mobile switching center when said mobile terminal reattaches.

18. A computer program product residing on computer usable medium for reducing call setup cost for mobile communications networks, comprising:

instruction means for determining at a home location register if a mobile terminal for a subscriber has detached from a visiting mobile switching center, including instruction means for determining at said home location register if a condition $Detach_i$ is true;

instruction means for determining if subsequent calls for said mobile terminal should be forwarded to said visiting mobile switching center by said home location register based on call arrival characteristics for said subscriber in response to said mobile terminal being not detached; and instruction means caching said determining information at a gateway mobile switching center for use by said gateway mobile switching center in determining to forward incoming calls for said mobile terminal to said home location register.

* * * * *